(12) United States Patent
Liu et al.

(10) Patent No.: US 7,689,778 B2
(45) Date of Patent: *Mar. 30, 2010

(54) PREVENTING SYSTEM SNOOP AND CROSS-SNOOP CONFLICTS

(75) Inventors: Yen-Cheng Liu, Portland, OR (US); Krishnakanth V. Sistla, Hillsboro, OR (US); George Cai, Lake Oswego, OR (US); Jeffrey D. Gilbert, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/000,768

(22) Filed: Nov. 30, 2004

(65) Prior Publication Data

US 2006/0117148 A1    Jun. 1, 2006

(51) Int. Cl.
*G06F 13/00* (2006.01)
(52) U.S. Cl. .................. 711/146; 711/121; 711/130

(58) Field of Classification Search .................. 711/146, 711/121, 130
See application file for complete search history.

(56) References Cited

U.S. PATENT DOCUMENTS

| | | | |
|---|---|---|---|
| 5,948,081 A * | 9/1999 | Foster | 710/40 |
| 6,314,491 B1 * | 11/2001 | Freerksen et al. | 711/124 |
| 6,321,307 B1 * | 11/2001 | Maguire et al. | 711/146 |
| 6,473,837 B1 * | 10/2002 | Hughes et al. | 711/146 |
| 6,976,131 B2 * | 12/2005 | Pentkovski et al. | 711/146 |
| 2003/0097531 A1 * | 5/2003 | Arimilli et al. | 711/146 |

* cited by examiner

*Primary Examiner*—Reba I Elmore
(74) *Attorney, Agent, or Firm*—Trop, Pruner & Hu, P.C.

(57) ABSTRACT

In various embodiments, hardware, software and firmware or combinations thereof may be used to prevent cache conflicts within microprocessors and/or computer systems. More particularly, embodiments of the invention relate to a technique to prevent cache conflicts within a processor and/or computer system in which a number of accesses may be made to a particular cache or group of caches.

18 Claims, 8 Drawing Sheets

PREVENTING SYSTEM SNOOP AND CROSS-SNOOP CONFLICTS

FIELD

Embodiments of the invention relate to microprocessors and microprocessor systems. More particularly, embodiments of the invention relate to preventing cache access conflicts within a processor or computer system in which a number of accesses occur to the same cache or group of caches.

BACKGROUND

Prior art processors and computer systems may be limited in the number of accesses to a particular cache or group of caches that can be concurrently managed. One prior art technique used to combat this problem has been the use of an inclusive cache structure whose cache entries correspond to the cache entries of one or more processor core-specific caches, such as level 1 (L1) caches.

In other words, prior art multi-core processors and/or multi-processor computer systems have attempted to reduce cache access conflicts within core caches by simply directing some of the cache accesses to a shared inclusive cache structure, such as a last level cache (LLC), that contains all of the cache entries of the processor cores or agents to which the inclusive cache structure corresponds. In the case of a cache access from a core within a multi-core processor, however, the core will typically attempt to access data first from its own cache and then resort to the shared cache. The shared inclusive cache structure is sometimes referred to as a "cache filter", as it shields core caches from excessive cache accesses, and therefore bus traffic, from other agents by providing the requested data to these agents from the inclusive cache instead of the core's cache.

The prior art technique of using a cache structure, such as an LLC, for servicing cache requests from various agents is helpful in allowing requesting agents to obtain the data they need without resorting to a cache of a processor core, for example, if the data is not exclusively owned or modified by a particular processor core. To the extent that an agent, such as a processor or processor core owns the cache line of its cache that the requesting agent is trying to access, a cache structure, such as an LLC, can allow the requesting agent to obtain the data it is requesting rather than waiting for the owning agent to share the data.

However, other conflicts can occur when using an LLC to service cache requests from external agents and processor cores. FIG. 1, for example, illustrates two cores attempting to access the same cache line of an LLC as an external agent. Particularly, in FIG. 1, core 0 has initiated a core cache request to a line in core 1's cache (via an LLC snoop) at substantially the same time as an external agent is snooping the LLC. In some cases, a snoop may need to be done by the LLC to core 1's cache ("cross snoop") in order to fulfill the core request of core 0, resulting in at least four different opportunities for a conflict to occur between the external agent's snoop of the LLC and the cross snoop.

The first potential conflict, "conflict window A" in FIG. 1, occurs before a core request look-up to the LLC cache and before the cross-snoop from the LLC to the other core is made. A second potential conflict, "conflict window B" in FIG. 1, occurs when there is a cross-snoop pending during a time when a snoop of the LLC from an external agent occurs. A third potential conflict, "conflict window C" in FIG. 1, occurs during a time after the cross-snoop has been initiated and the requesting core is awaiting the cross-snooped data and an external agent snoops the LLC. Finally, a fourth potential conflict, "conflict window D" in FIG. 1, occurs when the cross-snooped data has been returned to the requesting core and the LLC has yet to be updated with the cross-snoop data and an external agent snoops the LLC.

The prior art problem depicted in FIG. 1 is exacerbated as the number of processor cores or other bus agents increases in the system. For example, the conflicts depicted in FIG. 1 may double in a multi-core processor containing four cores instead of the two illustrated in FIG. 1. Similarly, as the number of processors increase in a computer system, so does the number of cross-snoops to any particular core cache, thereby increasing the number of conflicts that can occur during an LLC snoop by an external agent.

Cache conflicts, such as those depicted in FIG. 1, can have adverse effects on processor performance as resolving the conflicts takes multiple processing cycles. Accordingly, the number of agents or the number of cores within a multi-core computer system may be limited in prior art processor and/or computer systems.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to caching architectures within microprocessors and/or computer systems. More particularly, embodiments of the invention relate to a technique to manage cache conflicts within a processor and/or computer system in which a number of accesses may be made to a particular cache or group of caches.

This disclosure describes various embodiments of the invention to address problems associated with prior art caching techniques in multi-processor and/or multi-core computer systems, including conflict resolution and avoidance when a number of requesting agents attempt to access the same line of cache. In at least one embodiment of the invention, an inclusive cache structure, such as a last level cache (LLC), is used in conjunction with a number of processors or processor cores having an associated cache, such as a level 1 (L1) cache. Inclusive cache structures, such as an LLC, include those that contain at least the same data as other caches to which the inclusive cache structure corresponds. By maintaining coherence between the inclusive cache structure and corresponding core and/or processor caches, accesses to the corresponding core/processor caches are serviced by the inclusive cache, thereby reducing bus traffic to the corresponding cores/processors and allowing the cores/processors.

Embodiments of the invention, in which an inclusive cache structure is used, can also reduce or even prevent the number and/or types of conflicts that can occur when an agent external to a multi-core processor, such as another processor, ("external agent") and a processor core attempt to access the same line of cache within the inclusive cache structure.

For example, at least one embodiment of the invention prevents cache conflicts resulting from a cache snoop request from an external agent to a line within an inclusive cache structure, such as an LLC, that is being accessed as a result of a cross-snoop operation initiated by a core within the processor to which the LLC corresponds.

Throughout this disclosure, operations are referred to as "transactions" that may be performed via a command or set of commands. Furthermore, transactions mentioned throughout this disclosure may be performed via a sequence of bus cycles or signals from various functional units. The terms, "transaction", "operation", and "signal" may therefore be used interchangeably throughout this disclosure.

Figure 1:
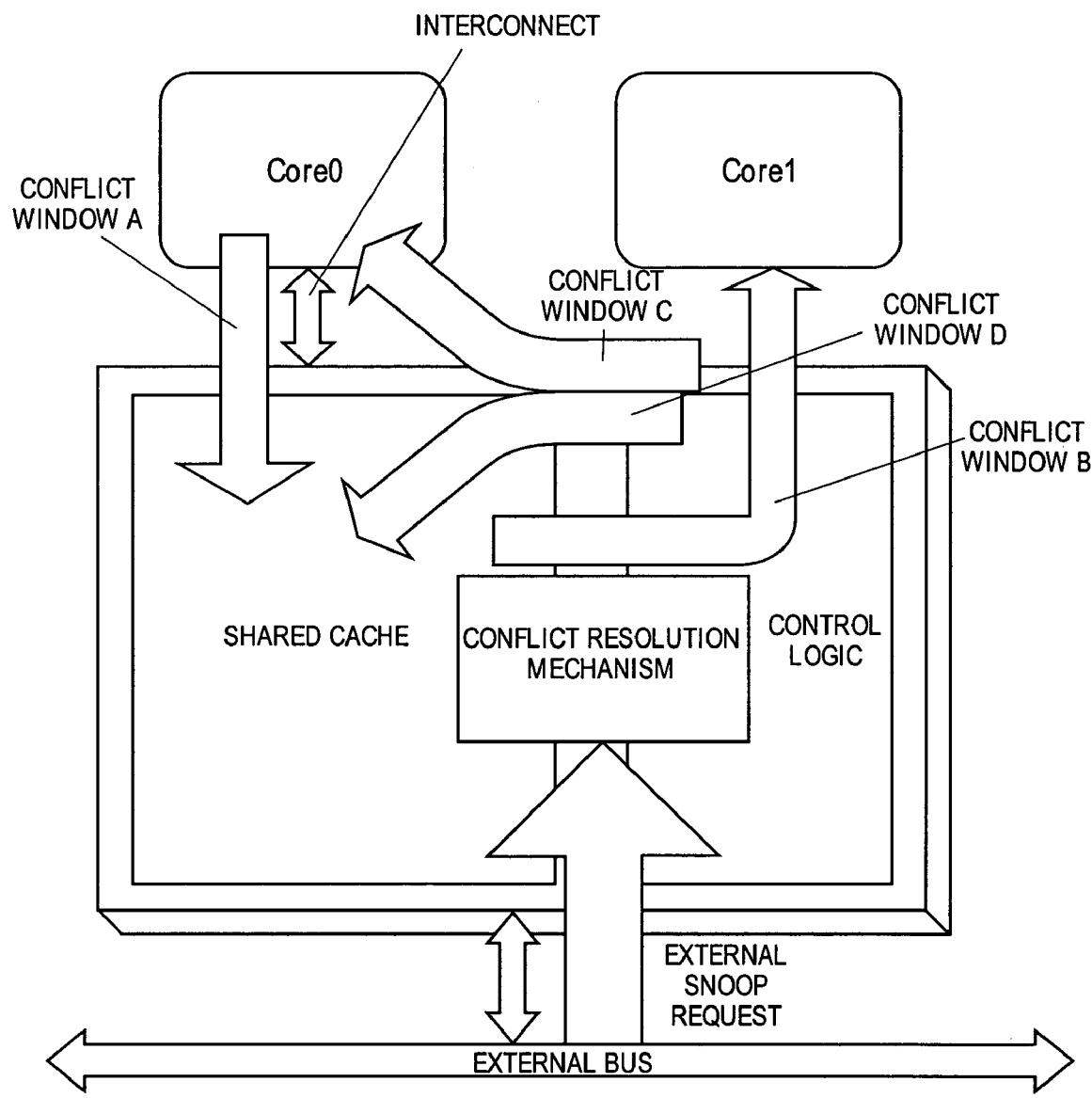
FIG. 1 illustrates a number of conflicts that can occur between snoops to a last level cache (LLC) by an external agent and cross-snoops between cores within a multi-core processor and/or within a multi-processor system.
Figure 2:
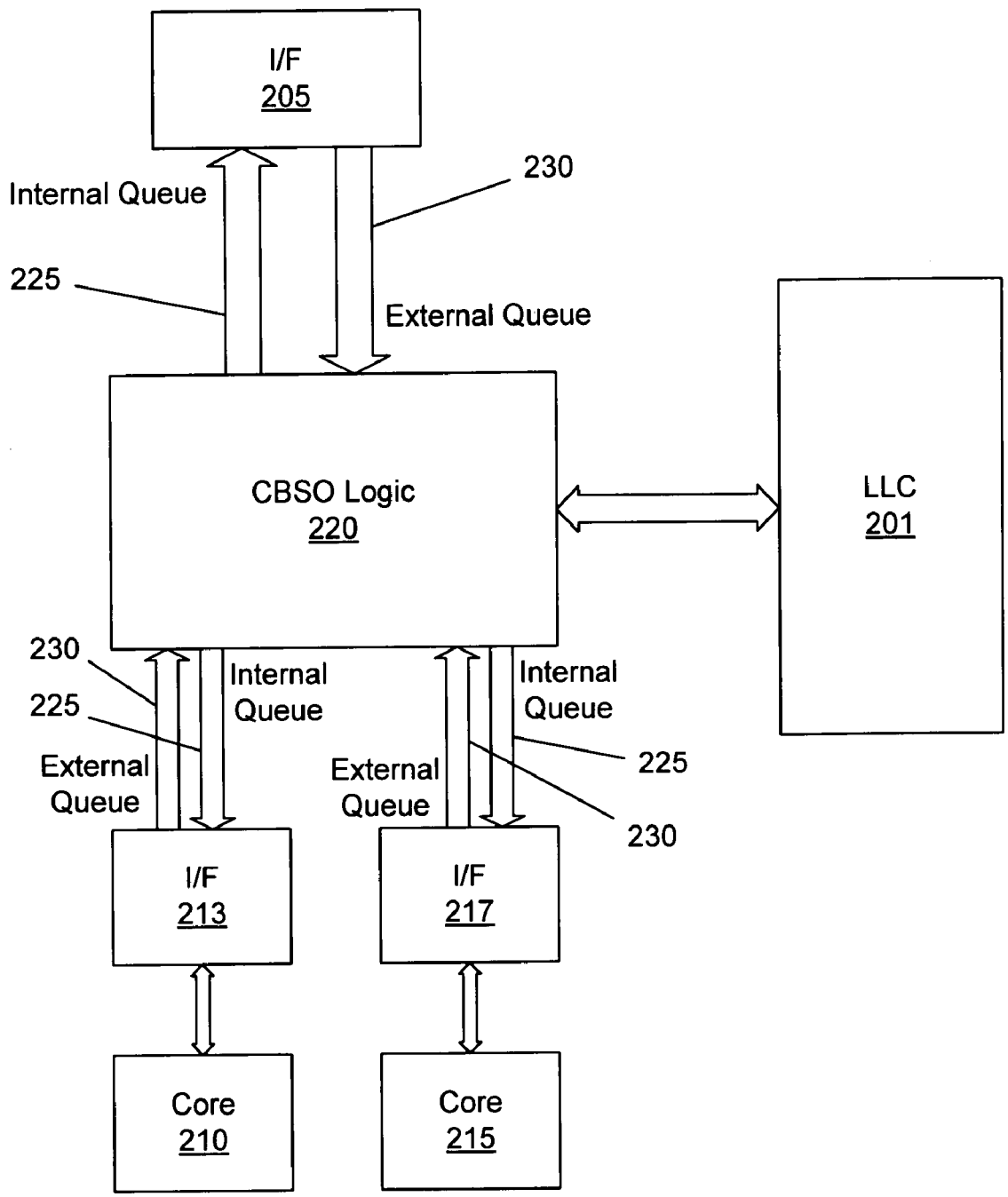
FIG. 2 illustrates a caching bridge architecture according to one embodiment of the invention.

FIG. 2 illustrates a caching bridge architecture in which techniques to prevent conflicts between external agent snoops and cross-snoops may be implemented, according to one embodiment of the invention. Specifically, the cache bridge architecture of FIG. 2 illustrates an LLC 201 that may be accessed by external agents via a computer system interconnect interface 205, such as a front-side bus interface or a point-to-point interface. Furthermore, the LLC may be accessed by core 0 210 and/or core 1 215 via core interconnect interfaces 213 and 217, respectively. The cache bridge scheduling and ordering (CBSO) logic 220 manages the accesses to the LLC from the external and core agents, in at least one embodiment of the invention, using internal and external request queues 225 and 230, respectively, which can be used to store command, address, and/or data corresponding to access to the LLC made by the external and/or core agents.

In at least one embodiment of the invention, the CBSO logic may be used to manage and prevent conflicts to the same cache line (i.e. same address) resulting from a number of transactions, including an LLC snoop by an external agent occurring at substantially the same time as a cross-snoop between cores of a multi-core processor.

An LLC access by either an external agent or core, typically involves read and read-for-ownership transactions from the cores/external agents accessing the LLC to read or gain ownership of a desired line of cache. If an LLC look-up initiated by a processor core results in a hit in another processor core's cache, the request may be allocated to another processor core's cache. In this case, several opportunities for conflicts, including those described above, may result between the core cross-snoop transaction and a snoop of the LLC from an external agent, such as another processor or other system agent.

Cross snoop transactions typically result when an ownership request from a core determines that the LLC line is owned by another core or when a read transaction from a core determines that another core may have the most current version of desired data in its cache. In these cases, the core requesting data from another core's cache will perform a snoop to the other core's cache ("cross snoop") owning the line, which can result in the core's line state changing from "exclusive" to "invalid" or "shared", depending on the particular coherency protocol being used. In one embodiment of the invention, the CBSO logic manages, or prevents, conflicts resulting from a snoop to the LLC from an external bus agent to a line being accessed in the LLC resulting from a cross-snoop transaction.

Figure 3:
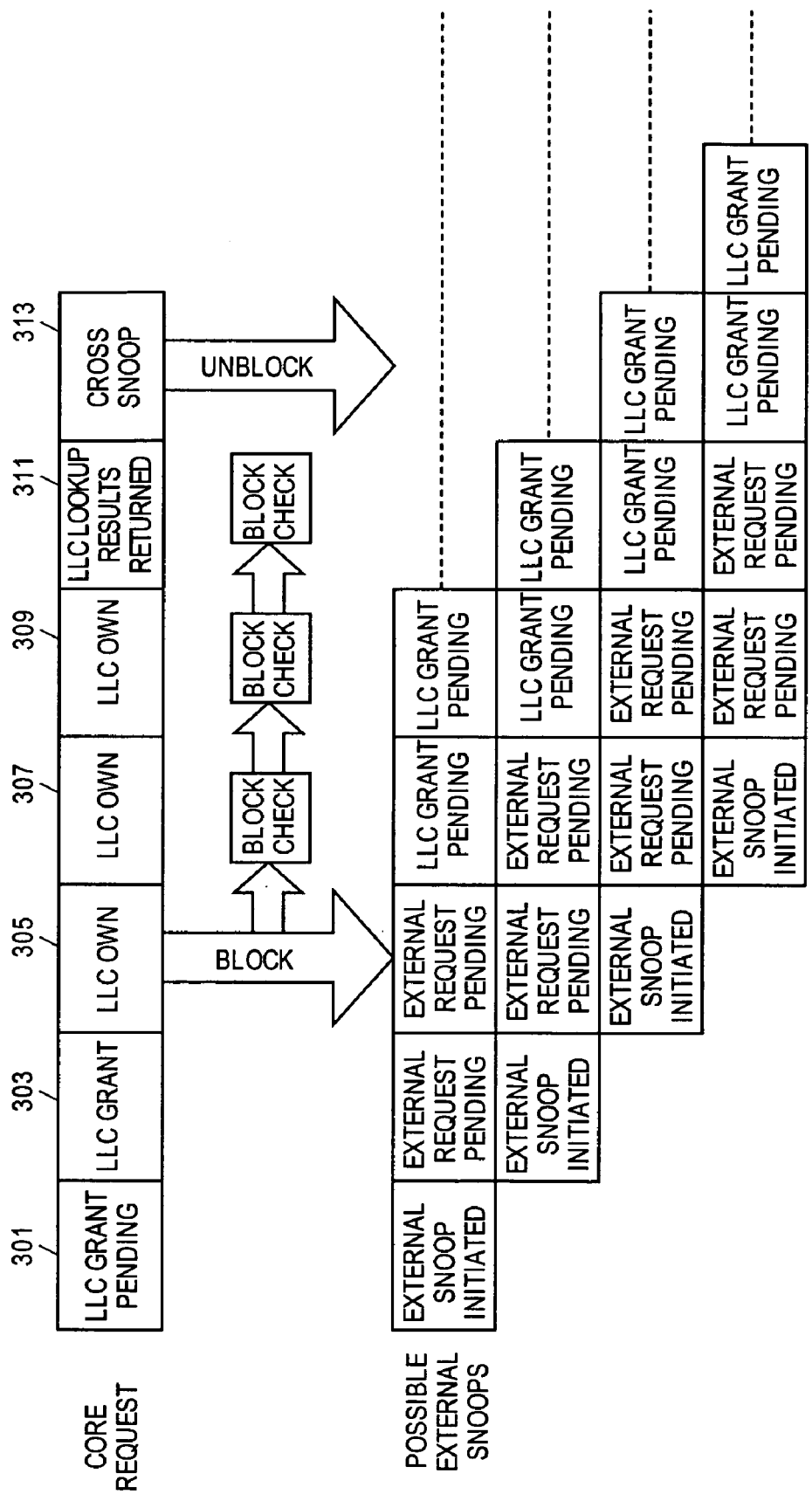
FIG. 3 illustrates a speculative snoop blocking mechanism according to one embodiment of the invention to prevent conflicts between accesses to an LLC by an external agent and cross-snoops between cores in a multi-core processor and/or within a multi-processor system.

FIG. 3 illustrates a technique, according to one embodiment of the invention, in which snoops to an LLC within a multi-core processor by an external agent are speculatively blocked upon a core within the multi-core processor gaining ownership of the LLC, or at least the same line of the LLC as to be snooped by the external agent. Particularly, FIG. 3 illustrates a processing cycle 301 during which an LLC grant is pending and an external agent initiates a snoop request to the LLC. During the next cycle 303, the LLC access is granted to the requesting core and the external agent's LLC grant request is pending. Moreover, other external snoops may be initiated by other external agents starting at cycle 303. At cycle 305, the requesting core gains ownership of the LLC and issues a speculative blocking command or other bus transaction that prevents all external agents from gaining ownership of the LLC. Accordingly, all accesses to the LLC by the external agents, beginning at cycle 305, are placed in a pending state until the requesting core de-asserts the snoop blocking signal.

External snoops coming before cycle 313 may change the cache state in the LLC line and cause a system error. Therefore, in one embodiment, external requests are blocked until cycle 313. If at cycle 313 the core request is indeed a cross snoop, then no unblocking signal will be sent at cycle 313, instead, unblock signal comes when cross snoop is completed.

In the embodiment illustrated in FIG. 3, issue blocking check transactions or signals may be issued in cycles following cycle 305 to determine if there are external agents requesting ownership of the LLC. In one embodiment, the block check transactions are issued every cycle after the requesting core gains ownership of the LLC until the requesting core stops blocking the external agent accesses to the LLC. In other embodiments, block checks may be issued with less frequency than every cycle between the cycle in which LLC ownership is granted when the cross snoop is completed. In other embodiments, the no issue block checks may be issued at all, and instead the snoop block signal is merely de-asserted after the cross snoop is complete.

In the embodiment of FIG. 3, block check transactions are issued during cycles 307, 309, and 311, and a snoop unblock signal is asserted at cycle 313 if it turns out not to be a cross snoop, which allows external agents to gain ownership of the LLC according to some arbitration scheme. In one embodiment the snoop blocking signal, the block checking signals, and the snoop unblock signal are asserted by the CBSO of FIG. 2. However, in other embodiments these signals may be asserted (and de-asserted) by other logic, software or some combination thereof located anywhere in the computer system in which the multi-core processor resides.

Figure 4:
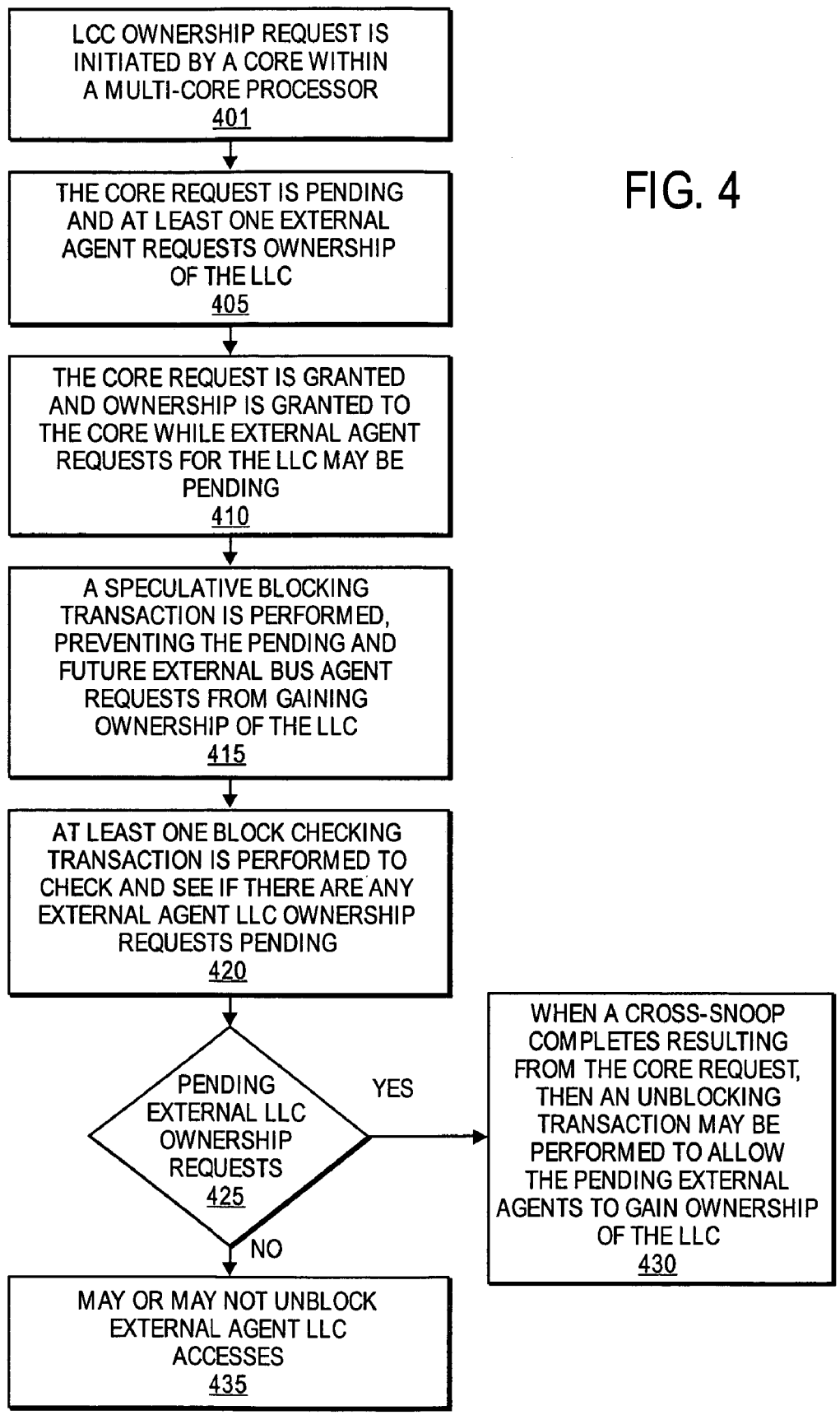
FIG. 4 is a flow diagram illustrating operations used in conjunction with a speculative snoop blocking technique according to one embodiment of the invention.

FIG. 4 is a flow diagram illustrating operations that may be used in conjunction with the embodiment illustrated in FIG. 3. At operation 401, an LLC ownership request is initiated by a core within a multi-core processor. At operation 405, the core request is pending and at least one external agent requests ownership of the LLC. At operation 410 the core request is granted and ownership is granted to the core while external agent requests for the LLC may be pending. At operation 415, a speculative blocking transaction is performed, preventing the pending and future external bus agent requests from gaining ownership of the LLC. At operation 420, at least one block checking transaction is performed to check and see if there are any external agent LLC ownership requests pending. If there are pending external LLC ownership requests at operation 425, then at operation 430, when a cross-snoop completes resulting from the core request, then an unblocking transaction may be performed to allow the pending external agents to gain ownership of the LLC. Otherwise, external LLC accesses may or may not be unblocked after the cross-snoop is complete at operation 435.

Figure 5:
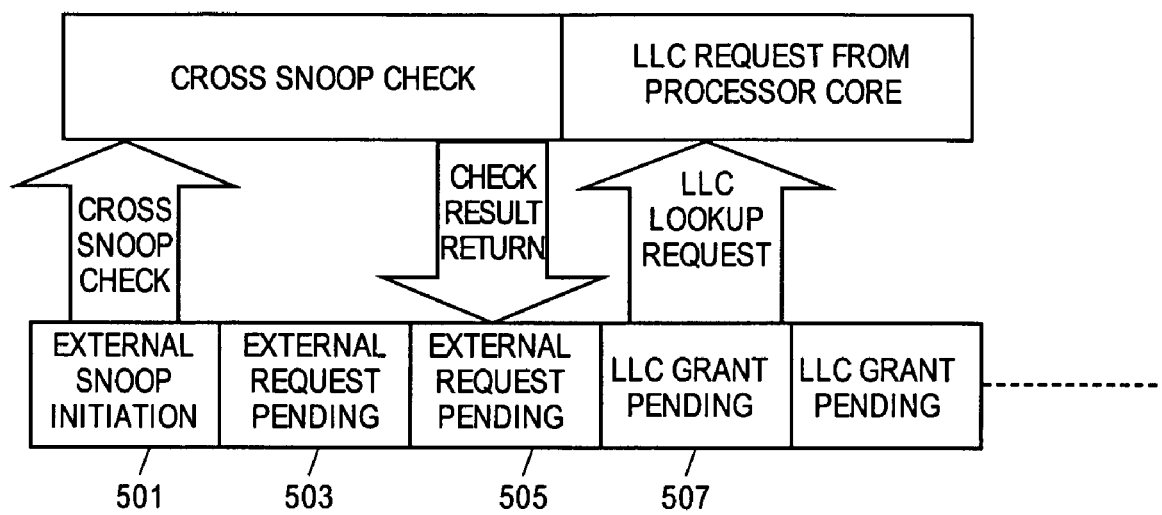
FIG. 5 illustrates a snoop blocking mechanism according to one embodiment of the invention to prevent conflicts between accesses to an LLC by an external agent and cross-snoops between cores in a multi-core processor and/or within a multi-processor system.

The embodiment illustrated within FIG. 3 and further described by the flow diagram of FIG. 4 can prevent snoop conflicts described above in reference to conflict window A (i.e. before a core request look-up of the LLC by a processor core). FIG. 5, on the other hand, illustrates a technique to prevent snoop conflicts described in reference to conflict windows B, C, and D (i.e. after the core request to the LLC has been initiated by a processor core).

Particularly, FIG. 5 illustrates a technique, according to one embodiment of the invention, in which conflicts between cross-snoops that have been initiated and subsequent external agent snoops the LLC may be avoided by blocking the external transactions. In FIG. 5, an external agent snoop of the LLC initiates a cross snoop check transaction at cycle 501 to determine if any cores of the processor to which the LLC corresponds have initiated a cross snoop transaction. At cycle 503, the external snoop request is pending as the snoop check completes. At cycle 505, a cross-snoop check result is returned to the external agent and if no cross-snoops have been initiated, an LLC grant request transaction is initiated at cycle 507, in which the external agent requests ownership of the LLC in lieu of any prior requests for ownership of the LLC from a processor core. Accordingly, at cycle 507, it is determined that a processor core has requested ownership of the LLC before the external agent, which causes the LLC snoop by the external agent to be blocked. At some later cycle, after the processor core completes its cross-snoop operation, the external LLC snoop may be unblocked and completed.

Figure 6:
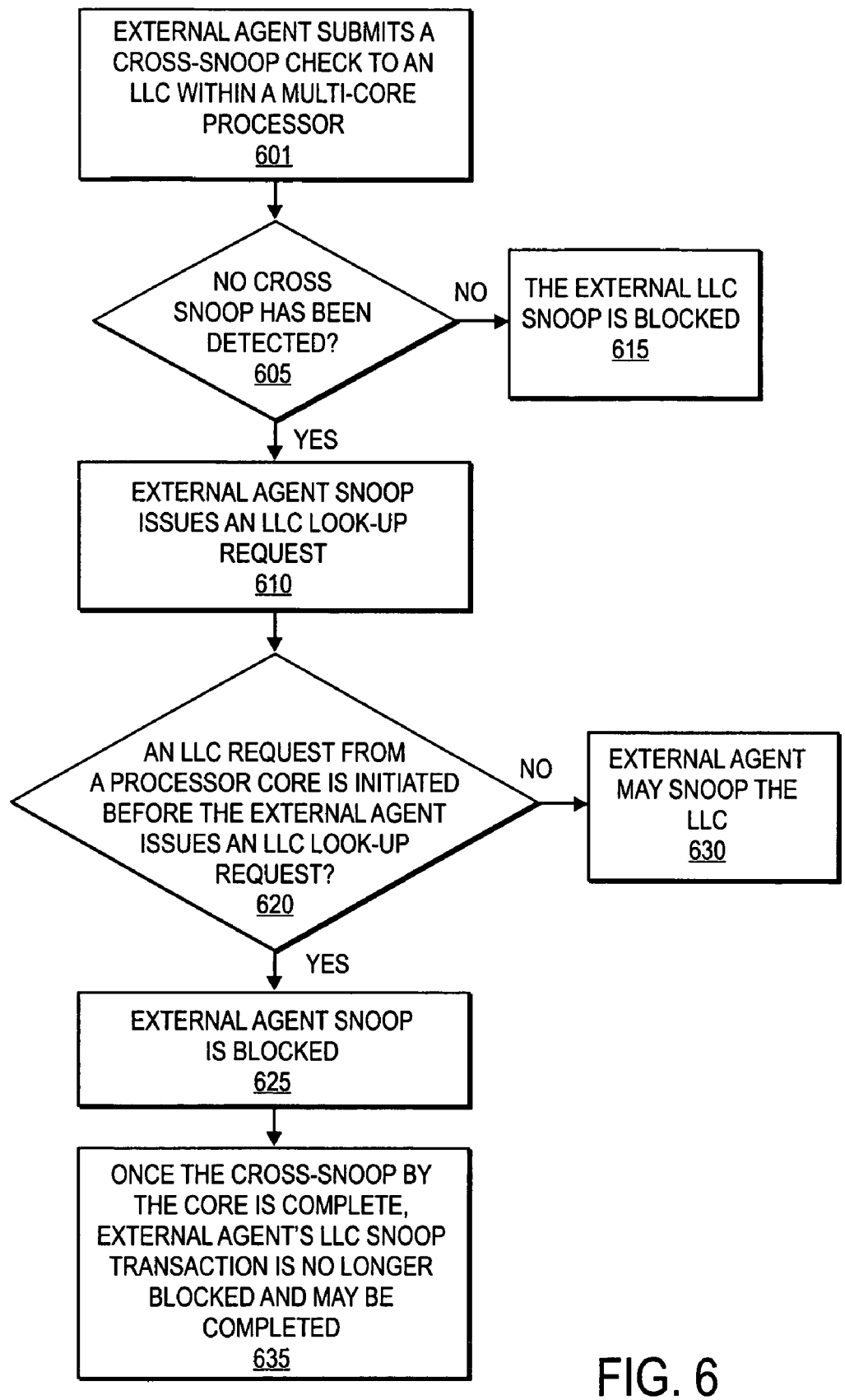
FIG. 6 is a flow diagram illustrating operations used in conjunction with a cross-snoop blocking technique according to one embodiment of the invention.

FIG. 6 is a flow diagram according to one embodiment of the invention, in which operations are performed, consistent with the transactions illustrated in FIG. 5. At operation 601, an external agent submits a cross-snoop check to an LLC within a multi-core processor. If no cross snoop has been detected, at operation 605, the external agent snoop issues an LLC look-up request at operation 610. Otherwise, the external LLC snoop is blocked at operation 615. If an LLC request from a processor core is initiated before the external agent issues an LLC look-up request, at operation 620, the external agent snoop is blocked at operation 625. Otherwise, the external agent may snoop the LLC at operation 630. Once the cross-snoop by the core is complete, at operation 635, external agent's LLC snoop transaction is no longer blocked and may completed.

Figure 7:
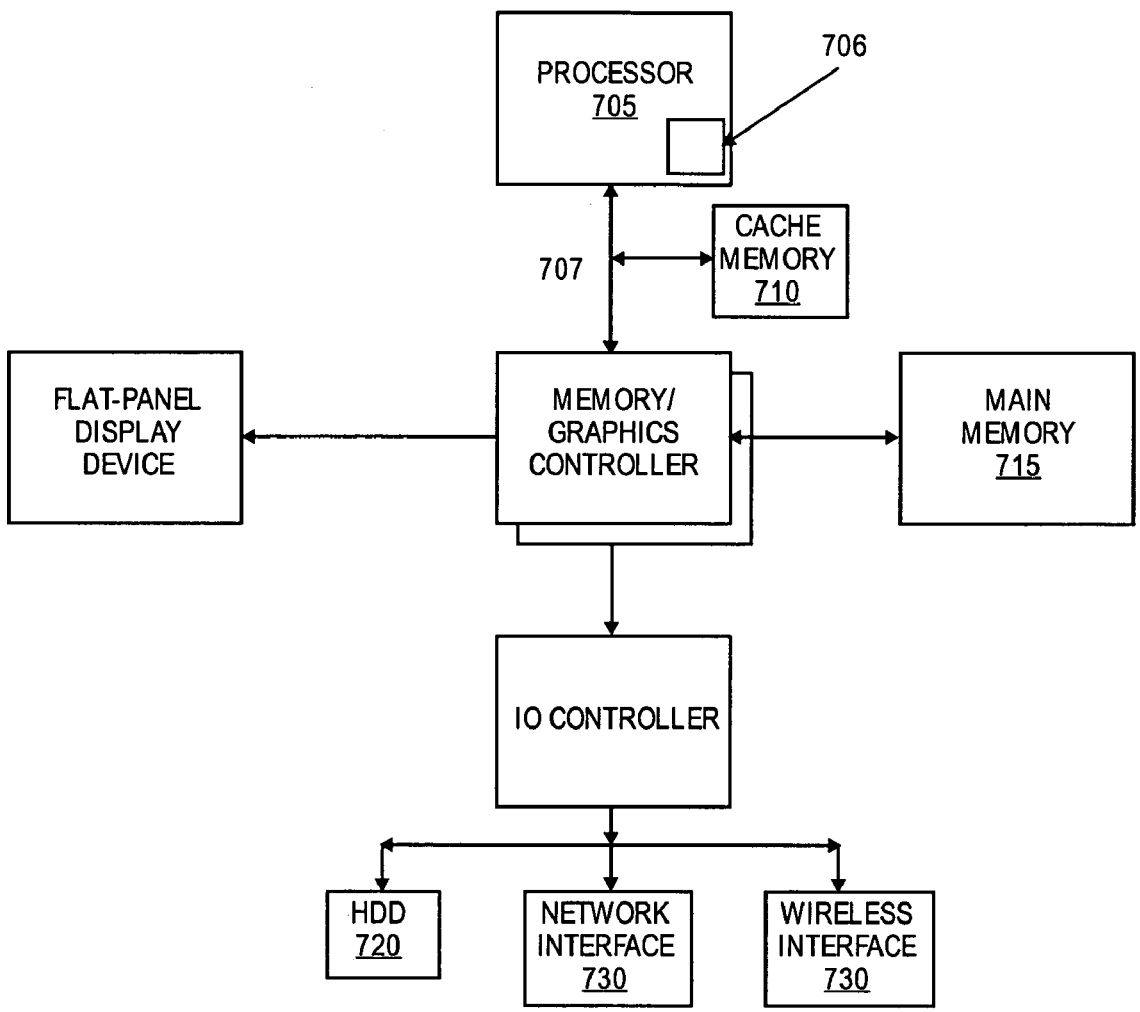
FIG. 7 illustrates a front-side bus computer system in which at least one embodiment of the invention may be used.

FIG. 7 illustrates a front-side-bus (FSB) computer system in which one embodiment of the invention may be used. A processor 705 accesses data from a level one (L1) cache memory 710 and main memory 715. In other embodiments of the invention, the cache memory may be a level two (L2) cache or other memory within a computer system memory hierarchy. Furthermore, in some embodiments, the computer system of FIG. 7 may contain both a L1 cache and an L2 cache, which comprise an inclusive cache hierarchy in which coherency data is shared between the L1 and L2 caches.

Illustrated within the processor of FIG. 7 is one embodiment of the invention 506. In some embodiments, the processor of FIG. 7 may be a multi-core processor.

The main memory may be implemented in various memory sources, such as dynamic random-access memory (DRAM), a hard disk drive (HDD) 720, or a memory source located remotely from the computer system via network interface 730 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

The computer system of FIG. 7 may be a point-to-point (PtP) network of bus agents, such as microprocessors, that communicate via bus signals dedicated to each agent on the PtP network. Within, or at least associated with, each bus agent is at least one embodiment of invention 506, such that store operations can be facilitated in an expeditious manner between the bus agents.

Figure 8:
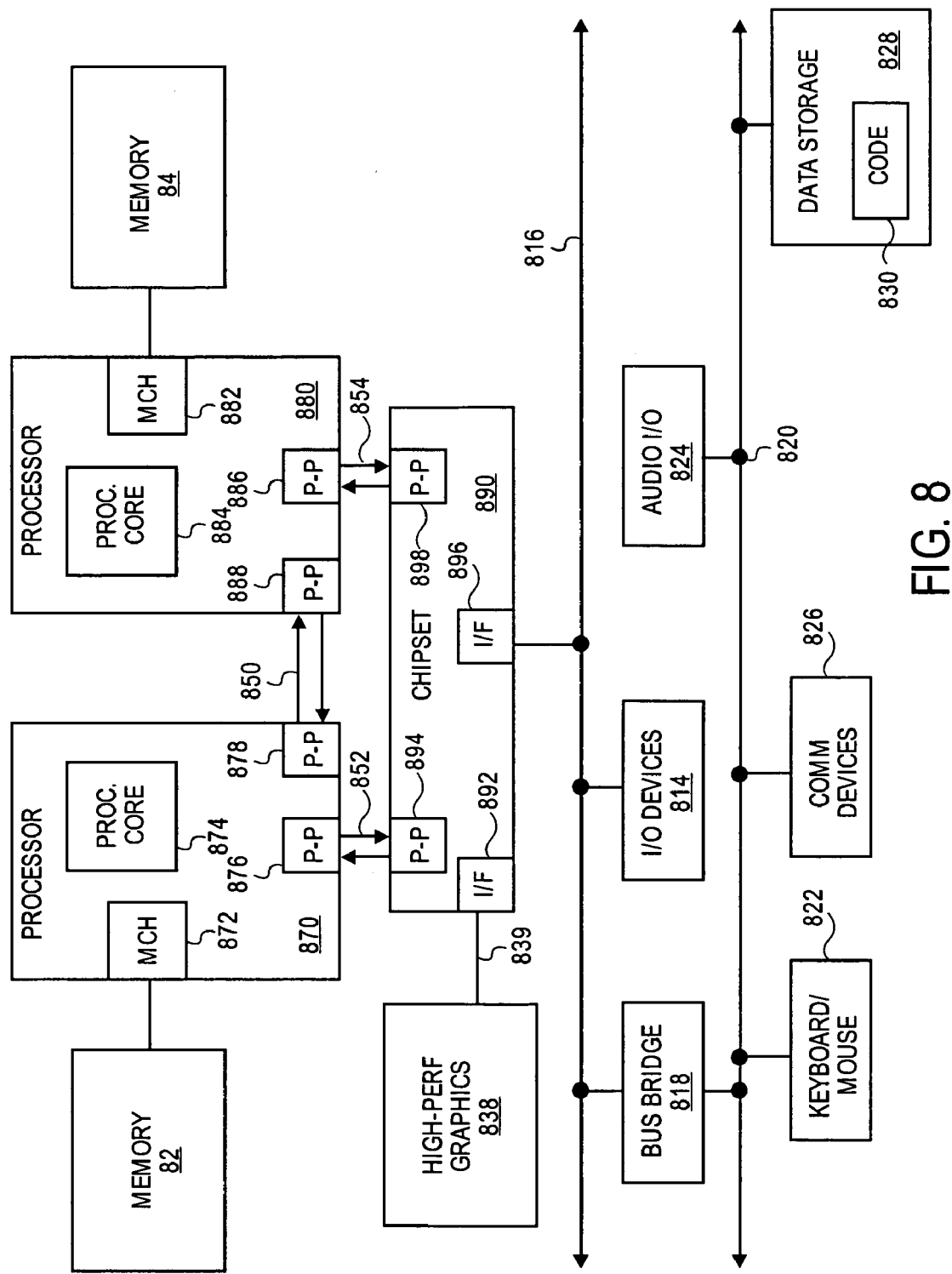
FIG. 8 illustrates a point-to-point computer system in which at least one embodiment of the invention may be used.

FIG. 8 illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 670, 680 are shown for clarity. Processors 870, 880 may each include a local memory controller hub (MCH) 872, 882 to connect with memory 62, 64. Processors 870, 880 may exchange data via a point-to-point (PtP) interface 850 using PtP interface circuits 878, 888. Processors 870, 880 may each exchange data with a chipset 890 via individual PtP interfaces 852, 854 using point to point interface circuits 876, 894, 886, 898. Chipset 890 may also exchange data with a high-performance graphics circuit 838 via a high-performance graphics interface 839.

At least one embodiment of the invention may be located within the processors 870 and 880. Other embodiments of the invention, however, may exist in other circuits, logic units, or devices within the system of FIG. 8. Furthermore, other embodiments of the invention may be distributed throughout several circuits, logic units, or devices illustrated in FIG. 8.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A method comprising:

initiating a first snoop operation from a first bus agent to a shared cache;

initiating a second snoop operation from a second bus agent to the shared cache, wherein the first bus agent is a first processor core within a multi-core processor and the second bus agent is a bus agent external to the multi-core processor;

blocking the second snoop operation to allow the first snoop operation to complete by issuance of a snoop blocking signal from a logic coupled between the shared cache, the first processor core and the external bus agent, the blocking to prevent the external bus agent and other external bus agents from gaining ownership of the shared cache until the snoop blocking signal is de-asserted;

issuing at least one block checking transaction from the logic after the first snoop operation has been initiated to determine if the second snoop operation is pending; and if the second snoop operation is pending, issuing a snoop unblock signal from the logic to unblock the second snoop operation after the first snoop operation has completed to allow the external bus agent to gain ownership of the shared cache.

2. The method of claim 1 wherein the second snoop operation does not occur if the first snoop operation is initiated first.

3. The method of claim 1 wherein the second snoop operation is blocked if the first snoop operation is initiated prior to the second bus agent issuing a look-up request to the shared cache.

4. The method of claim 1 wherein the first snoop operation is a snoop to another core's cache within the multi-core processor caused by the first processor core.

5. The method of claim 4 wherein the second snoop operation is a snoop to an inclusive shared cache within the multi-core processor by the second bus agent.

6. The method of claim 1, further comprising placing the second snoop operation in a pending state until the snoop blocking signal is de-asserted.

7. The method of claim 1, further comprising avoiding a conflict between the first snoop operation and the second snoop operation by issuing the snoop blocking signal.

8. The method of claim 1, further comprising initiating a snoop check operation from the second bus agent to the shared cache before the second snoop operation, the snoop check operation to determine if the first bus agent has initiated a cross snoop transaction.

9. A system comprising:
a multi-core processor including a first processor core, and a shared cache to store data to be used by cores within the multi-core processor, and a logic coupled to the first processor core and the shared cache to block a snoop operation from an external agent by issuance of a snoop blocking signal to prevent the external agent and other external agents from gaining ownership of the shared cache until the snoop blocking signal is de-asserted, issue at least one block checking transactions after a cross-snoop operation has been initiated within the multi-core processor to determine if the snoop operation is pending, and if the snoop operation is pending, issue a snoop unblock signal to unblock the snoop operation after the cross-snoop operation has completed to allow the external agent to gain ownership of the shared cache;

the external agent coupled to a bus external to the multi-core processor, the external agent to initiate the snoop operation to the shared cache if the cross-snoop operation is not in progress, wherein the external agent is to check for cross-snoop operations being initiated within the multi-core processor by submission of a cross-snoop check to the shared cache before initiation of the snoop operation, and if the external agent detects a cross-snoop operation, the external agent does not snoop the shared cache until the cross-snoop operation is complete, otherwise the external agent snoops the shared cache.

10. The system of claim 9 wherein if the first processor core initiates a shared cache look-up before the snoop operation is initiated from the external agent, the external agent is blocked from completing its snoop operation until the cross-snoop is completed.

11. The system of claim 10 wherein snoops from the external bus agent are checked, after the first processor core initiates the shared-cache look-up, to see if the external agent has initiated a snoop operation to the shared cache.

12. The system of claim 10 wherein snoops from the external agent are unblocked after the cross-snoop is completed.

13. The system of claim 12 wherein the multi-core processor and the external agent are to communicate on a shared bus.

14. The system of claim 12 wherein the multi-core processor and external agent are to communicate on a point-to-point bus.

15. The system of claim 14 wherein the external agent is a multi-core processor.

16. A processor comprising:
a plurality of cores each associated with a private cache;
a shared cache coupled to the plurality of cores;
a logic coupled to the shared cache and the plurality of cores, the logic to receive a cross-snoop check from an external agent to the shared cache, and to issue a look-up request to the shared cache if no cross-snoop from one of the plurality of cores has been detected, wherein the logic is to allow the external agent to snoop the shared cache if no request from one of the plurality of cores is initiated before the external agent issues the look-up request, and otherwise to block the look-up request via a snoop blocking signal that is to prevent the external agent from gaining ownership of the shared cache until the snoop blocking signal is de-asserted if a cross-snoop to the shared cache from one of the plurality of cores has been detected responsive to the cross-snoop check, issue at least one block checking transaction after the cross-snoop has been initiated to determine if the look-up request is pending, and to unblock the look-up request via a snoop unblock signal after the cross-snoop is completed to allow the external agent to gain the shared cache ownership.

17. The processor of claim 16, wherein the processor comprises a multi-core processor.

18. The processor of claim 16, wherein the processor is to couple to the external agent via a point-to-point bus.

* * * * *